United States Patent
Schneider et al.

(10) Patent No.: US 9,935,508 B2
(45) Date of Patent: Apr. 3, 2018

(54) INDIVIDUAL-SEGMENT ROTOR HAVING INDIVIDUAL SEGMENTS RETAINED BY FLEXURAL SUPPORTS AND PRODUCTION METHOD (71) Applicant: SIEMENS AKTIENGESELLSCHAFT, München (DE)

(72) Inventors: Helmut Schneider, Bad Kissingen (DE); Armin Stäblein, Fladungen (DE); Benjamin Volkmuth, Sulzthal (DE); Jörg Müller, Nüdlingen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 133 days.

(21) Appl. No.: 14/784,882

(22) PCT Filed: Aug. 27, 2013

(86) PCT No.: PCT/EP2013/067656
§ 371 (c)(1),
(2) Date: Oct. 15, 2015

(87) PCT Pub. No.: WO2014/169972
PCT Pub. Date: Oct. 23, 2014

(65) Prior Publication Data
US 2016/0065011 A1    Mar. 3, 2016

(30) Foreign Application Priority Data

Apr. 16, 2013  (EP) .................................... 13163936

(51) Int. Cl.
H02K 1/27    (2006.01)
H02K 1/28    (2006.01)
H02K 15/03   (2006.01)
H02K 1/22    (2006.01)
H02K 15/02   (2006.01)

(52) U.S. Cl.
CPC ............. *H02K 1/22* (2013.01); *H02K 1/2773* (2013.01); *H02K 1/28* (2013.01); *H02K 15/03* (2013.01); *H02K 15/02* (2013.01)

(58) Field of Classification Search
CPC ...................... H02K 1/27–1/2793; H02K 1/28
(Continued)

(56) References Cited

U.S. PATENT DOCUMENTS 5,091,668 A * 2/1992 Cuenot ................ H02K 1/2773
                                                    310/156.61
6,175,177 B1 * 1/2001 Sabinski .............. H02K 1/2773
                                                    310/156.55
(Continued)

FOREIGN PATENT DOCUMENTS

CN    1144577 A    3/1997
CN    1375122 A    10/2002
(Continued)

OTHER PUBLICATIONS

"adhesive, adj. and n." OED Online. Oxford University Press, Jun. 2017. Web. Jul. 26, 2017.*

*Primary Examiner* — Thomas Truong
(74) *Attorney, Agent, or Firm* — Henry M. Feiereisen LLC (57) ABSTRACT The aim is to provide an individual-segment rotor, the construction of which requires low production expenditure. For this purpose, an individual-segment rotor having an axis of rotation and a plurality of laminated core segments (5) arranged around the axis of rotation is provided. Each laminated core segment (5) is radially fastened to a separate flexural support (11). All flexural supports (11) are radially retained by at least one fastening ring (14).

5 Claims, 8 Drawing Sheets (58) Field of Classification Search
USPC ............. 310/216.007, 216.129, 156.56
See application file for complete search history.

(56) References Cited

U.S. PATENT DOCUMENTS

| | | | |
|---|---|---|---|
| 6,259,180 B1* | 7/2001 | Pop, Sr. .............. | H02K 1/2773 29/598 |
| 6,703,741 B1 | 3/2004 | Ifrim | |
| 8,853,894 B2 | 10/2014 | Fick et al. | |
| 2006/0097601 A1 | 5/2006 | Hauger | |
| 2011/0254399 A1 | 10/2011 | Blanc et al. | |
| 2012/0299429 A1* | 11/2012 | Choi .................. | H02K 1/2773 310/156.12 |
| 2013/0127264 A1 | 5/2013 | Fick et al. | |
| 2013/0241337 A1* | 9/2013 | Tremelling ......... | H02K 1/2766 310/156.19 |
| 2013/0300229 A1 | 11/2013 | Müller et al. | |
| 2015/0244218 A1* | 8/2015 | Kaufmann ......... | H02K 1/2773 310/156.58 |

FOREIGN PATENT DOCUMENTS

| | | |
|---|---|---|
| CN | 102124635 A | 7/2011 |
| DE | 220 182 A1 | 3/1985 |
| DE | 689 06 910 T2 | 11/1993 |
| DE | 102008026648 A1 | 12/2009 |
| EP | 0549430 A1 | 6/1993 |
| EP | 2 639 935 B1 | 9/2013 |
| GB | 2 159 342 A | 11/1985 |
| WO | WO 2014040893 A2 * | 3/2014 ........... H02K 1/2773 |

* cited by examiner

INDIVIDUAL-SEGMENT ROTOR HAVING INDIVIDUAL SEGMENTS RETAINED BY FLEXURAL SUPPORTS AND PRODUCTION METHOD

CROSS-REFERENCES TO RELATED APPLICATIONS

This application is the U.S. National Stage of International Application No. PCT/EP2013/067656, filed Aug. 27, 2013, which designated the United States and has been published as International Publication No. WO 2014/169972 and which claims the priority of European Patent Application, Serial No. 13163936.1, filed Apr. 16, 2013, pursuant to 35 U.S.C. 119(a)-(d).

BACKGROUND OF THE INVENTION

The present invention relates to an individual-segment rotor having an axis of rotation and a plurality of laminated core segments which are arranged around the axis of rotation. The present invention further relates to a method for producing an individual-segment rotor by arranging a plurality of laminated core segments around an axis of rotation.

Individual-segment rotors for electric motors with flux concentration are characterized in that the rotor is provided with permanent magnets arranged in a star-shaped manner, the permanent magnets are polarized in the direction of movement and the intermediate space between the individual permanent magnets in each case is filled by a ferromagnetic segment. Such an individual segment is generally produced as a laminated core and, therefore, may be denoted as a laminated core segment. The individual laminated core segments are, if possible, not connected together in order to avoid scatter.

The construction and production of an electric motor with magnets in flux concentration requires specific techniques: in particular, the construction should be scatter-resistant and suitable for mass production. Since a scatter-resistant construction generally requires the use of individual laminated segments, i.e. laminated core segments, and thus involves a higher production cost, such a construction hinders a mass production process. Previous embodiments of corresponding rotors were a compromise between individual rotor segment laminations, on the one hand, and rotor laminations, on the other hand, wherein the individual laminations are connected together. With complete rotor laminations it is achieved that the laminated rotor core is able to be produced in a more mechanically stable and simple manner but a portion of the flux of the magnets is short-circuited. This is made possible, for example, by stamped and stacked rotor cores in which the inner separating bridges are kept at defined spacings. Individual segments as are disclosed, for example, in the post-published European patent application EP 12 159 917.9 provide the advantage that a short circuit is not produced.

Moreover, in an individual-segment rotor with flux concentration the rotor lamination should be constructed so as to be separated by means of "non-magnetic" material (relative permeability $\mu_r < 5$) between each pole. This leads to a high number of individual segments which have to be joined together. Moreover, problems regarding the positioning and retention of the magnets and laminated core segments and the torque transmission have to be overcome.

SUMMARY OF INVENTION

The object of the present invention, therefore, is to propose an individual-segment rotor for an electric machine, the individual segments thereof being retained on the rotor in a stable manner with a low assembly cost.

According to the invention this object is achieved by an individual-segment rotor comprising an axis of rotation and
a plurality of laminated core segments which are arranged around the axis of rotation, wherein each laminated core segment in each case is radially fastened to a separate flexural support and
all of the flexural supports are radially retained by at least one fastening ring.

Furthermore, according to the invention a method for producing an individual-segment rotor is provided by arranging a plurality of laminated core segments around an axis of rotation,
radially fastening each laminated core segment in each case to a separate flexural support and
fixing all of the flexural supports by at least one fastening ring in the radial direction.

Advantageously, therefore, the laminated core segments, i.e. the individual segments, are retained by flexural supports which in turn are fixed together by a fastening ring. By means of the flexural supports, therefore, elements which are optimized with regard to fixing may be used. The flexural supports in this case may be preferably arranged such that they do not affect or barely affect the magnetic flux in the laminated core segments.

Preferably, all of the flexural supports are configured to be strip-shaped and each flexural support protrudes from both front faces of the respective laminated core segment. A high degree of radial stiffness may be achieved by the strip shape and the corresponding radial alignment. If the flexural supports protrude from the front faces, they are able to act there on the fastening ring(s).

In one embodiment, the fastening ring is able to press the flexural supports radially inwardly. As a result, the laminated core segments fastened thereto are pressed onto a sleeve or shaft arranged in the center, whereby they are stabilized.

Alternatively, the fastening ring is also able to press the flexural supports radially outwardly. This, however, requires the laminated core segments to be otherwise retained radially outwardly against movement. The individual-segment rotor is in turn stabilized by the pretensioning of the fastening ring relative to the flexural supports.

The fastening ring may be configured as an end plate and secure the flexural supports against any movement perpendicular to the axis of rotation. This is possible, for example, by the flexural supports being retained in the end plate by a material, non-positive or positive connection. Thus, the laminated core segments are reliably fixed in all directions perpendicular to the axis of rotation.

Preferably, such end plates are located on both front faces of the individual-segment rotor. Thus the laminated core segments are reliably fixed to both front faces. By this symmetrical construction the individual-segment rotor may be axially lengthened in a simple modular manner.

In one embodiment, all of the flexural supports may be positively fastened in the respective laminated core segments. As a result, high forces may be transmitted from the flexural supports to the laminated core segments.

Alternatively, however, all of the flexural supports may also be fastened in the respective laminated core segments by a non-positive or material connection. Thus, the flexural supports, for example, may be adhesively bonded into the laminated core segments. This has potential production advantages.

Moreover, all of the laminated core segments may be retained positively in the circumferential direction on a sleeve, the relative permeability thereof being below 5. This positive connection in the circumferential direction has the advantage that greater torques may be transmitted from the sleeve to the laminated core segments. Notwithstanding the above, it is advantageous if the sleeve is "non-magnetic", i.e. the relative permeability thereof is below 5. Magnetic scatter, which reduces the efficiency, is thereby avoided.

All of the laminated core segments may also be retained positively in the radial direction on a sleeve, the relative permeability thereof being below 5. This has the advantage that the sleeve is able to absorb the centrifugal forces of the laminated core segments. Notwithstanding the above, it is also advantageous if the sleeve is non-magnetic.

BRIEF DESCRIPTION OF THE DRAWING

The present invention is now described in more detail with reference to the accompanying drawings, in which.

DETAILED DESCRIPTION OF PREFERRED EMBODIMENTS

The following exemplary embodiments described in more detail hereinafter represent preferred embodiments of the present invention.

Figure 1:
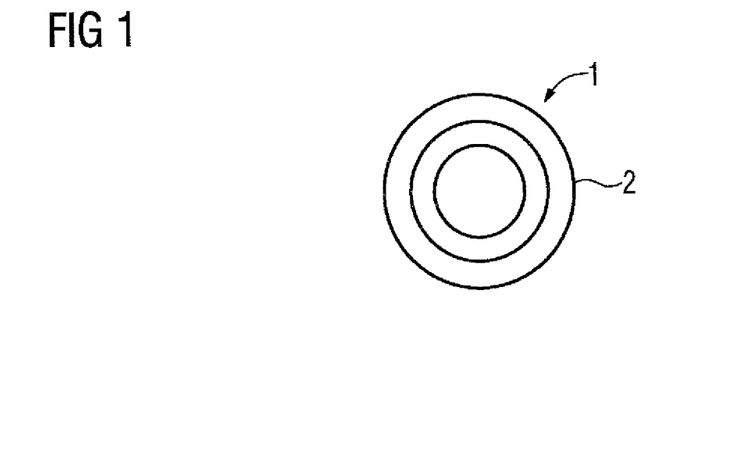
FIG. 1 shows a front side view of a shaft.

FIG. 1 shows a front side view of a shaft 1. The shaft has a shoulder 2 which serves as a stop for a sleeve 3 to be mounted (see FIG. 2). The sleeve 3 is "non-magnetic", i.e. the relative permeability thereof is below 5, preferably below 1.5. The sleeve 3 in this case has grooves 4 extending axially on its outer circumference.

Figure 2:
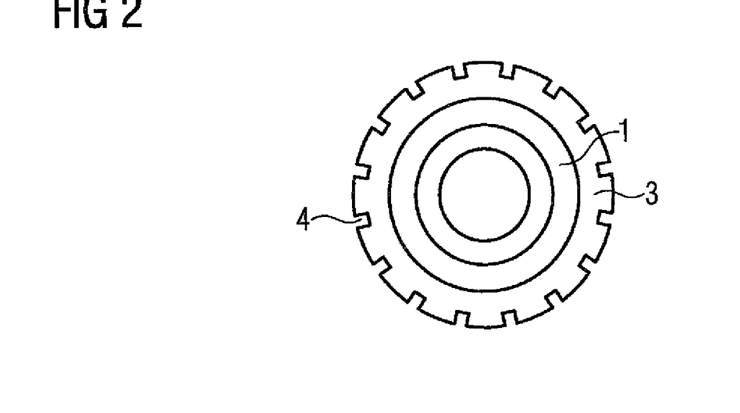
FIG. 2 shows the shaft of FIG. 1 with the sleeve.

The non-magnetic sleeve 3 serves to isolate magnetically the laminated core segments which are fitted subsequently. The laminated core segments which are subsequently inserted may be positioned by means of the grooves 4, said grooves additionally serving for torque transmission. Alternatively, a non-magnetic solid shaft may be also used.

Figure 3:
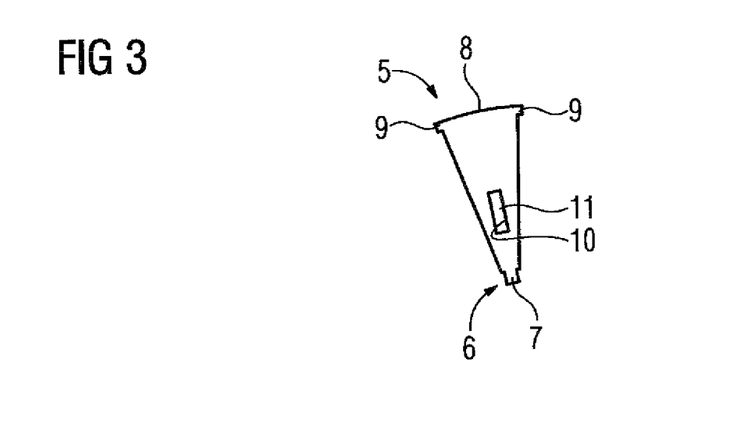
FIG. 3 shows a front side view of a laminated core segment.

FIG. 3 shows a laminated core segment 5 in a front side view, i.e. a view in the axial direction. The laminated core segment 5 is formed from a stack of similar-shaped individual laminations. The cross section of the laminated core segment 5, therefore, has the shape of an individual lamination fitted therein. The cross section in this case is substantially triangular. A tip 6 of the triangular laminated core segment 5 faces in the fully mounted state of the individual-segment rotor towards its axis of rotation and in this case is provided with a spring 7.

On the narrow outer face 8 the laminated core segment 5 has in each case a shoulder 9 on both edges.

A recess 10 is provided in one portion which is located closer to the tip 6 than to the outer face 8. The recess has in the present example a rectangular cross section and extends along the axis of symmetry of the laminated core segment 5. The main direction of extension of the recess 10 extends along this axis of symmetry and/or plane of symmetry and extends in the fully mounted state of the individual-segment rotor in the radial direction.

In this case, a strip-shaped and/or bar-shaped flexural support 11 is inserted into the recess 10. It fills the recess 10 substantially completely. For an individual-segment rotor according to FIG. 2 the shaft 1 is pre-mounted with the sleeve 3 and according to FIG. 3 numerous laminated core segments 5 are pre-mounted with flexural supports 11. According to FIG. 4 the pre-fitted laminated core segments 5 are placed in a star-shaped manner on the shaft 1 pre-mounted with the sleeve 3. In the present exemplary example, the individual-segment rotor has sixteen laminated core segments 5. This number may naturally also be greater or less than sixteen.

Figure 4:
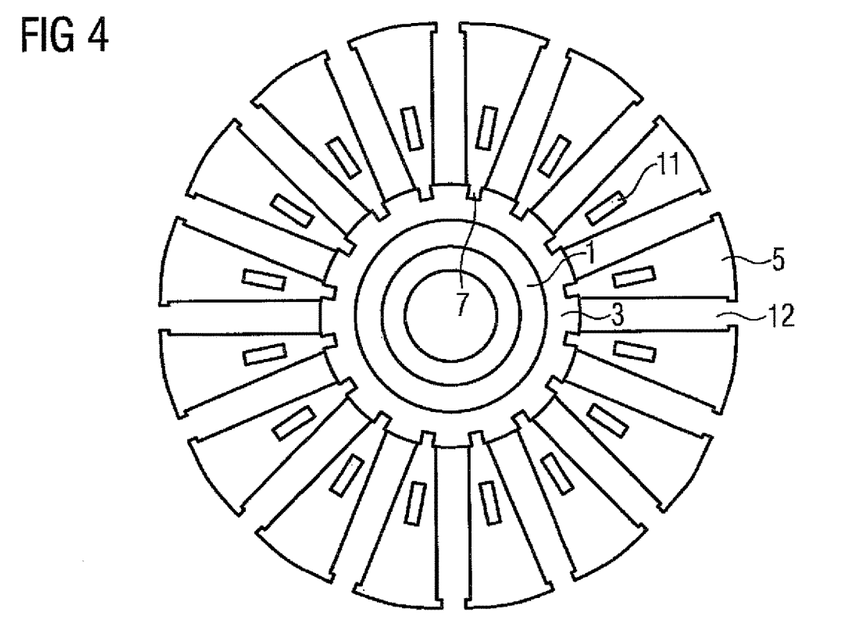
FIG. 4 shows a front side view of the shaft with the sleeve according to FIG. 2 and the individual segments of the rotor according to FIG. 3 in position.

The laminated core segments 5 are spaced apart from one another. A magnetic pocket 12 which is rectangular in cross section is produced between two respectively adjacent laminated core segments 5. As the laminated core segments 5 are placed in the non-magnetic sleeve 3, the individual laminated core segments 5 are magnetically insulated from one another even if they are mechanically connected together.

All of the laminated core segments 5 with their springs 7 are inserted in the grooves 4 of the sleeve 3. A high torque may be transmitted via this positive connection in the circumferential direction between the laminated core segments 5 and the non-magnetic sleeve 3.

Figure 5:
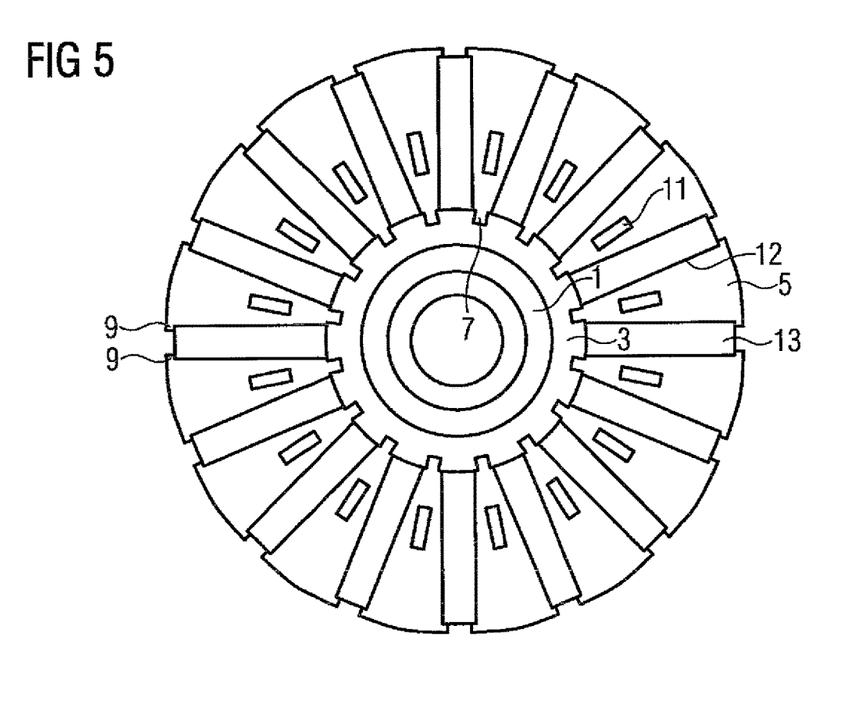
FIG. 5 shows the arrangement of FIG. 4 with the inserted magnets.

In a subsequent production step according to FIG. 5 magnets 13 are inserted into the magnetic pockets 12. The permanent magnets 13 have the same overall axial length as the laminated core segments 5. Moreover, the permanent magnets 13 are polarized in the circumferential direction and the magnetic flux is in each case deflected by the laminated core segments 5 in the radial direction according to the flux concentration principle.

As the magnetic pockets on their outer face have shoulders 9, the magnetic pockets 12 are tapered outwardly, so that the permanent magnets 13 are retained positively in the magnetic pockets 12. The other sides of the magnetic pockets 12 form the respectively adjacent laminated core segments 5 in the circumferential direction and a portion of the sleeve 3 radially inwardly.

Figure 6:
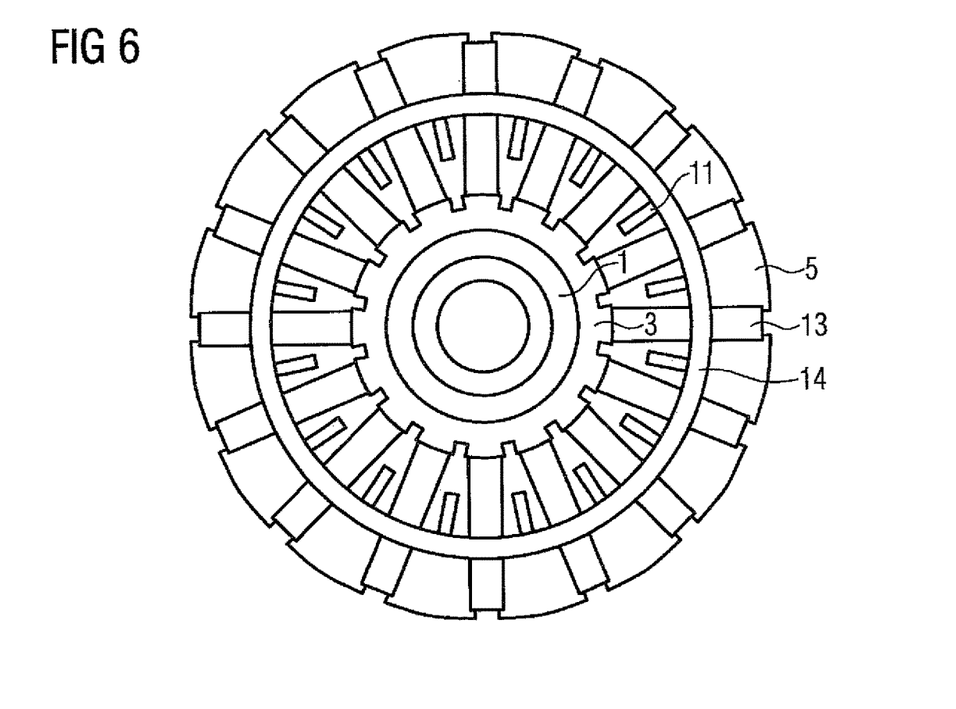
FIG. 6 shows the arrangement of FIG. 5 with the clamping ring fitted.

The flexural supports 11 inserted into the recesses 10 of the laminated core segments 5 are slightly longer in the axial direction than the laminated core segments 5. They protrude, therefore, at least from one front face of the arrangement of FIG. 5, preferably from both front faces. As the laminated core segments 5 previously had no radial retention on the outside, a clamping ring 14 is fitted to a front face of the arrangement of FIG. 5 on the outside around all of the flexural supports 11. The clamping ring 14, therefore, represents a fastening ring for the flexural supports 11. It prevents the flexural supports 11 from being able to be moved radially outwardly. Moreover, it presses the flexural supports 11 with corresponding pretensioning toward the axis of rotation of the shaft 1. Thus it also presses all of the laminated core segments 5 in the radial direction onto the sleeve 3. Preferably, a similar clamping ring 14 is also applied to the opposing front face of the arrangement of FIG. 5.

During production, the clamping rings 14 are heated and pulled over the flexural supports 11 which protrude over the laminated core on both sides. During the cooling process, the clamping rings 14 contract and thus fix the rotor in the radial direction. Moreover, they indirectly secure the magnets in the radial direction via the laminated core segments 5 and the shoulders 9 thereof. Moreover, the fastening rings 14 also secure the magnets in the axial direction. Alternatively, the clamping rings may be tensioned by a bayonet closure. Additionally or alternatively, the clamping rings 14 may be connected by a positive and/or material connection to the flexural supports 11.

Figure 7:
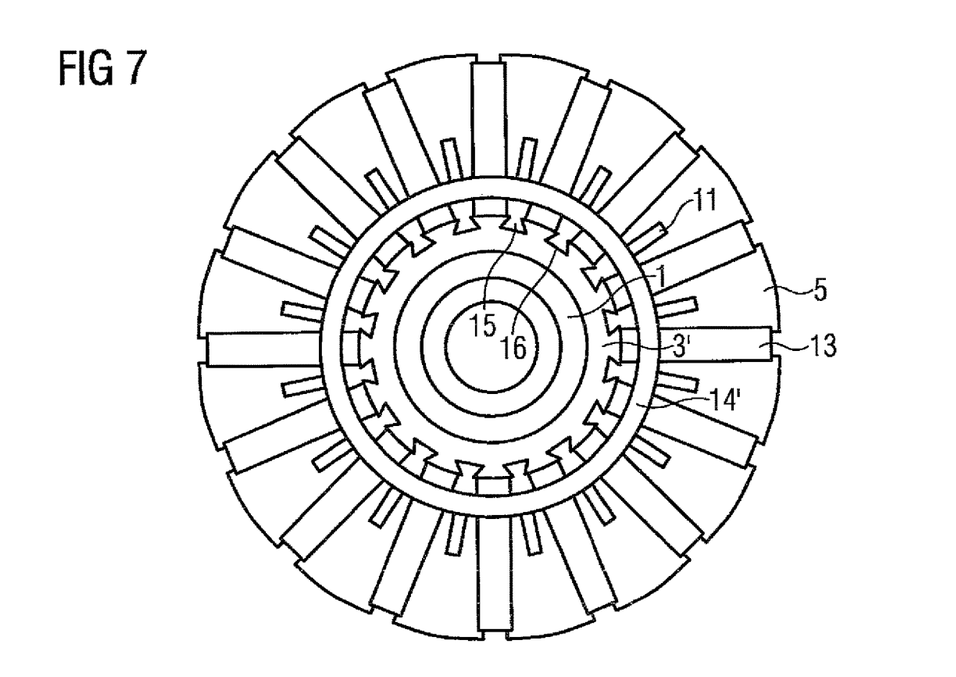
FIG. 7 shows an alternative embodiment with the compression ring fitted.

FIG. 7 shows an alternative embodiment to the example of FIG. 6. The construction of the individual-segment rotor corresponds substantially to that of FIG. 6. Instead of the clamping ring 14, in this case a compression ring 14' is joined to the inner faces of the flexural supports 11. The radial fixing and positioning of the laminated core segments is implemented by a positive connection acting radially between the respective laminated core segment 5 and a correspondingly designed sleeve 3' and/or the shaft 1. For example, a dovetail connection between the laminated core segment 5 and the non-magnetic sleeve 3' serves for this purpose. In particular, to this end a laminated core segment 5 may have a dovetail 15 which is axially guided in a corresponding dovetail groove 16. The torque is additionally transmitted via this positive connection.

The compression ring 14', in this case tensioned below the flexural supports 11, ensures as a fastening ring that the joining surfaces of the laminated core segments 5 and the sleeve 3' abut one another in a defined manner and thus represent the desired external diameter of the rotor. Moreover, these compression rings 14' which are located on the two front faces fix the magnets in the axial direction.

Figure 8:
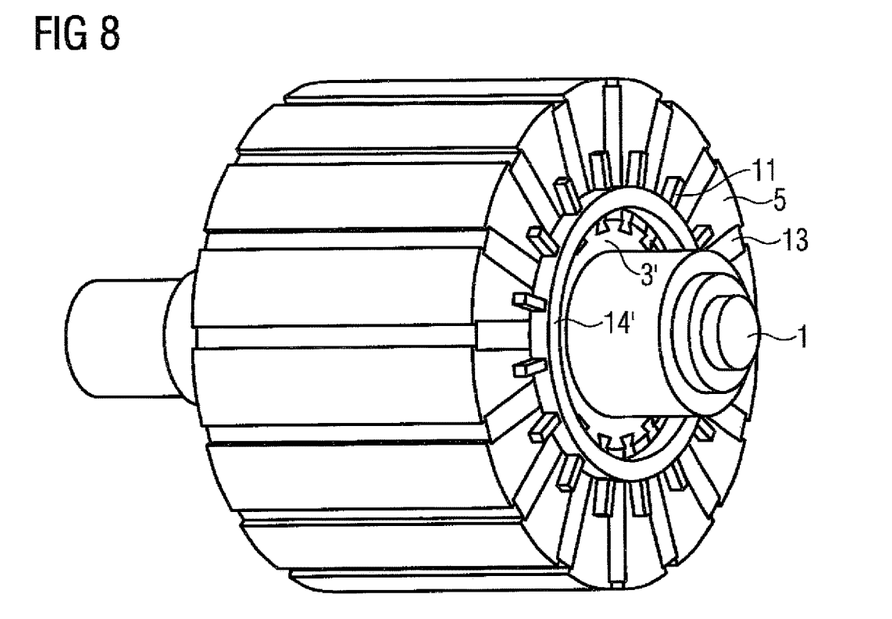
FIG. 8 shows an individual-segment rotor according to FIG. 7 in a three-dimensional view.
Figure 9:
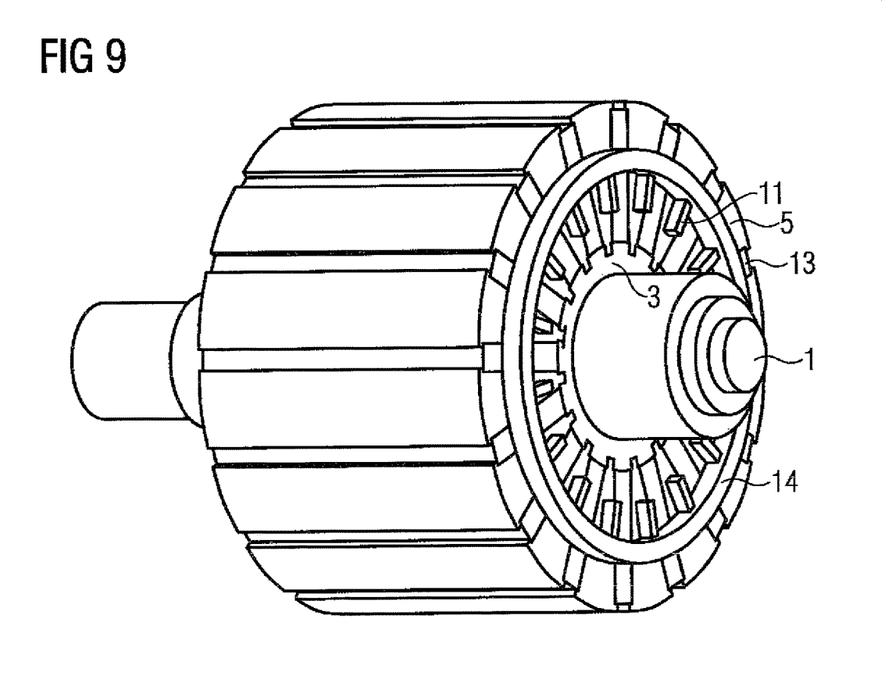
FIG. 9 shows an individual-segment rotor according to FIG. 6 in a three-dimensional view.
Figure 10:
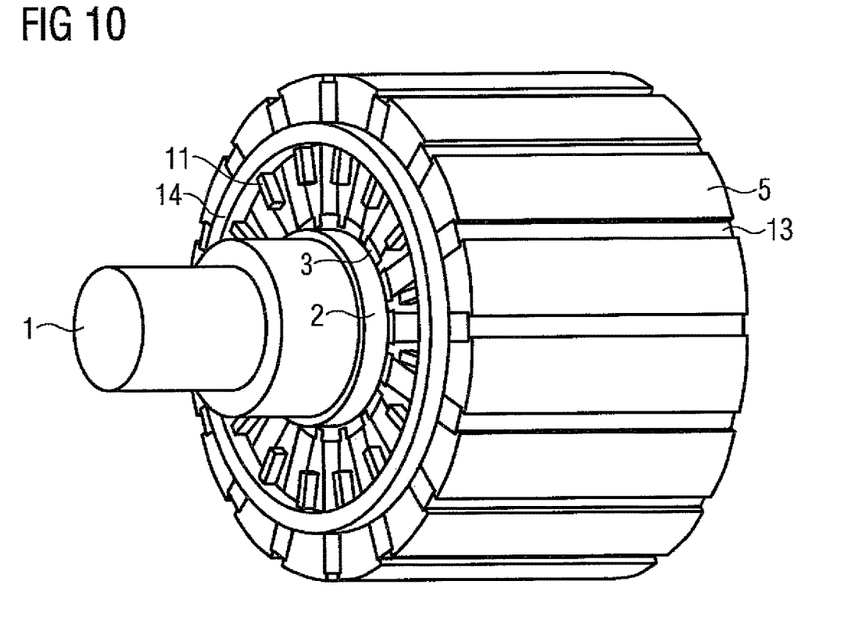
FIG. 10 shows the individual-segment rotor of FIG. 9 in a view rotated by 90°.

FIG. 8 shows the individual-segment rotor of FIG. 7 in a three-dimensional view. In particular, it may be seen here how the flexural supports 11 protrude on the front face of the laminated core and/or the laminated core segments 5. The compression ring 14' serving as a fastening ring is located radially below the protruding portions of the flexural supports 11. In FIG. 9, the individual-segment rotor of FIG. 6 is shown in a three-dimensional view. In this case it may be seen clearly that the protruding portions of the flexural supports 11 are encompassed by the clamping ring 14. The view of FIG. 10 rotated by 90° also shows the same clamping ring on the opposing front face of the individual-segment rotor. Moreover, it may be seen here how the shoulder 2 of the shaft 1 serves as an axial stop for the sleeve 3.

The individual-segment rotors described above have numerous advantages. In particular, a known mass-produced material may be used for the shaft. Only for the sleeve 3, 3' does a corresponding non-magnetic, potentially more costly, material have to be used. It is also advantageous that the positioning and joining contours on the sleeve and laminated core segments transmit the torque and moreover simplify the mounting and permit a small air gap.

A particular advantage of the construction described above is also that the individual segments of the rotor may be obtained already joined together, resulting in a reduction in the length of the manufacturing process. Moreover, they are easily produced by known techniques and permit a scatter-resistant construction. Additionally, by the positioning of the magnets directly in the lamination, no further components are required.

Advantageously, the tension ring stabilizes the rotor, fixes the magnets in the axial direction and prevents the individual segments from being lifted away radially as mentioned above. The compression ring also stabilizes the rotor, fixes the magnets in the axial direction and produces a defined stop surface of the laminated core segment and sleeve for achieving a fixed external diameter and/or small air gap.

By the use of intermediate plates, the core deflection may be reduced. This permits a variation in the overall length. According to a further development, any air gaps between the magnet and laminated core may be filled by impregnating, for example, with a liquid resin. These air gaps could otherwise lead to movements of the magnet, which could damage and/or destroy it.

Figure 11:
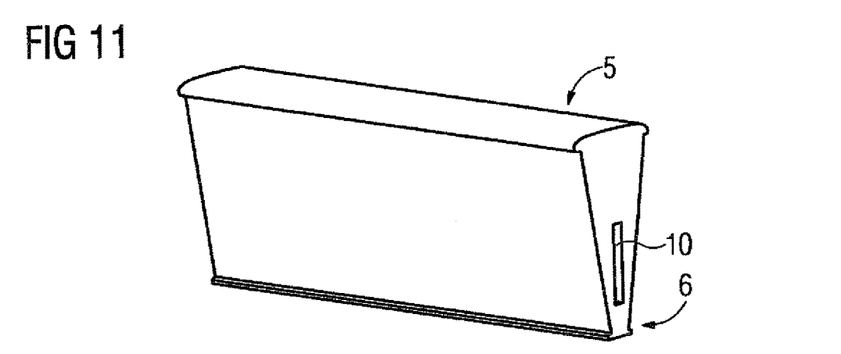
FIG. 11 shows a three-dimensional view of an individual segment of the rotor of a further embodiment.

A further exemplary embodiment of the present invention is now described in connection with FIGS. 11 to 18. FIG. 11 shows a three-dimensional view of an individual segment of the rotor and/or laminated core segment 5. It has substantially the shape already described in connection with FIG. 3. The base 6 of the laminated core segment 5, which in the fully-mounted state of the individual-segment rotor 5 faces toward the center and/or the shaft 1, in this case may be of different design as the torque is transmitted in a different manner. In particular, the spring 7 may be dispensed with (see FIG. 3).

Figure 13:
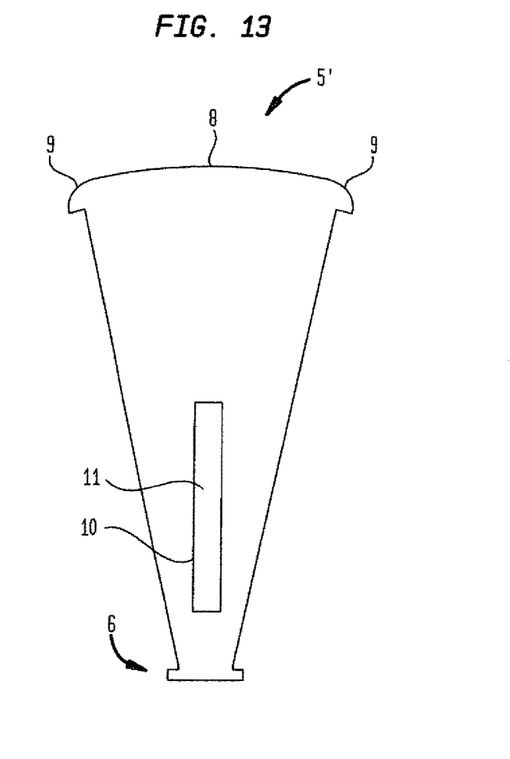
FIG. 13 shows a front side view of the individual segment of the rotor of FIG. 12.

In this case, a bar-shaped flexural support 11 is inserted into the recess 10 of the laminated core segment 5. The flexural support 11 protrudes on both front faces from the laminated core segment 5. In cross section, therefore, the view of FIG. 13 is produced which is very similar to that of FIG. 3. In the present example, the recess 10 is completely surrounded by the laminated material of the laminated core segment 5 and/or the respective individual lamination. Thus a positive connection is achieved between the flexural support 11 and the laminated core segment 5.

Figure 14:
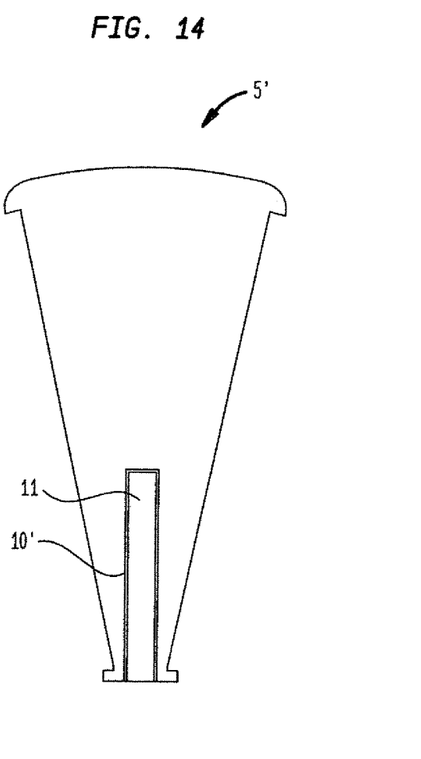
FIG. 14 shows a front side view of an alternative individual segment of the rotor.

Alternatively, the flexural support 11 may be held by a material connection in a laminated core segment 5' according to FIG. 14. In this case, the recess 10' is open downwardly, i.e. toward the shaft and/or axis. The flexural support 11 in this case is adhesively bonded into the open recess 10' or otherwise connected by a material connection during pre-mounting.

Figure 15:
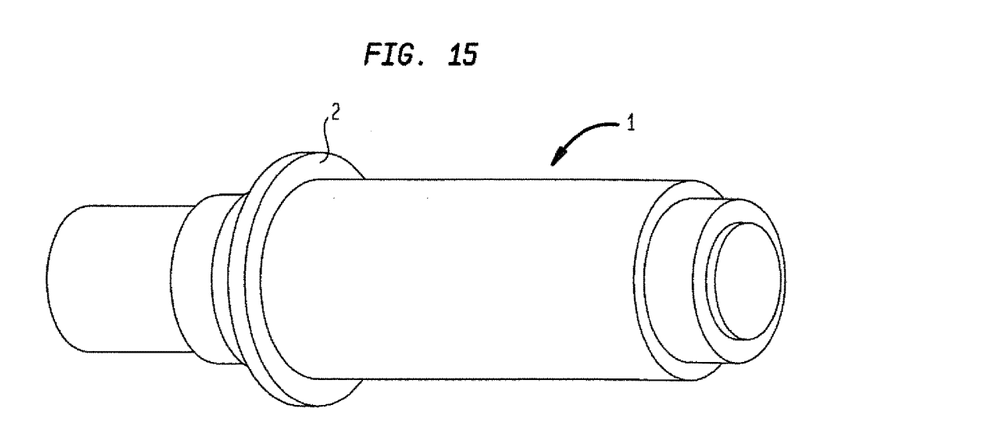
FIG. 15 shows a three-dimensional view of a shaft.
Figure 16:
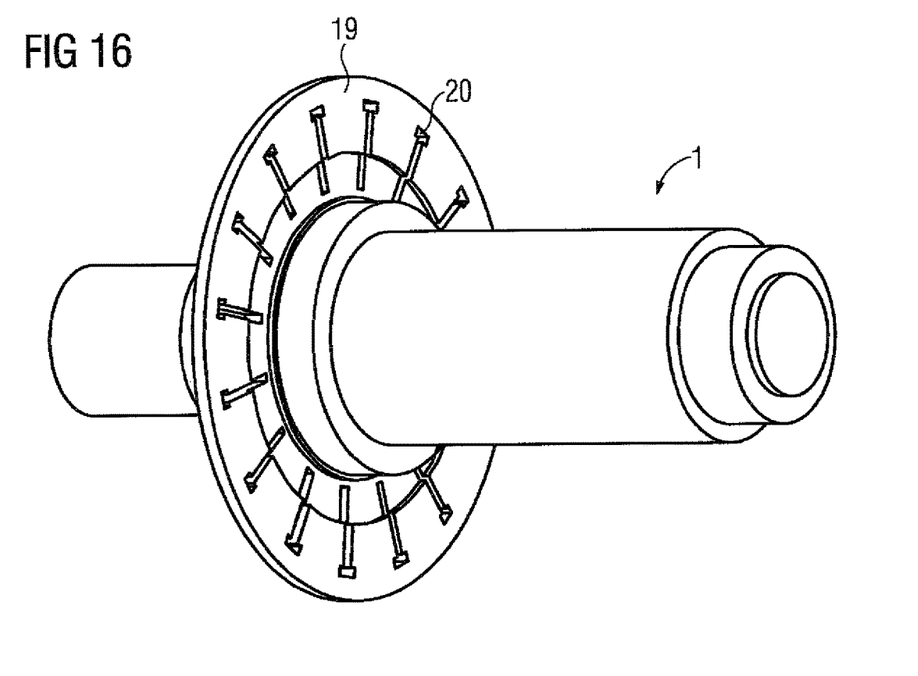
FIG. 16 shows the shaft of FIG. 15 with the mounted end plate.

FIG. 15 now shows the shaft 1 in a three-dimensional view. The shoulder 2 also serves here as an axial stop. According to FIG. 16, an end plate 15 is mounted as a fixing on the shaft 1. The end plate 15 has slot-shaped recesses 16 which in each case extend in the radial direction and thus are arranged in a star-shaped manner.

Figure 12:
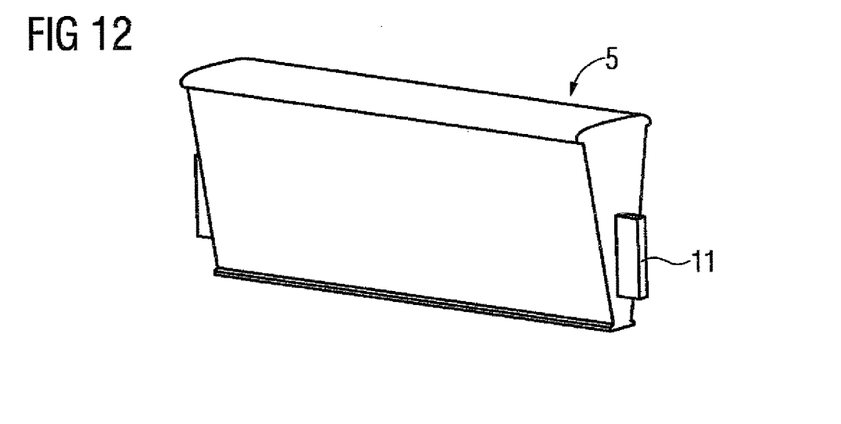
FIG. 12 shows the individual segment of the rotor with the inserted flexural support.

For producing the individual-segment rotor, numerous laminated core segments 5 with inserted flexural supports 11 according to FIG. 12 or the like have been pre-mounted.

Figure 17:
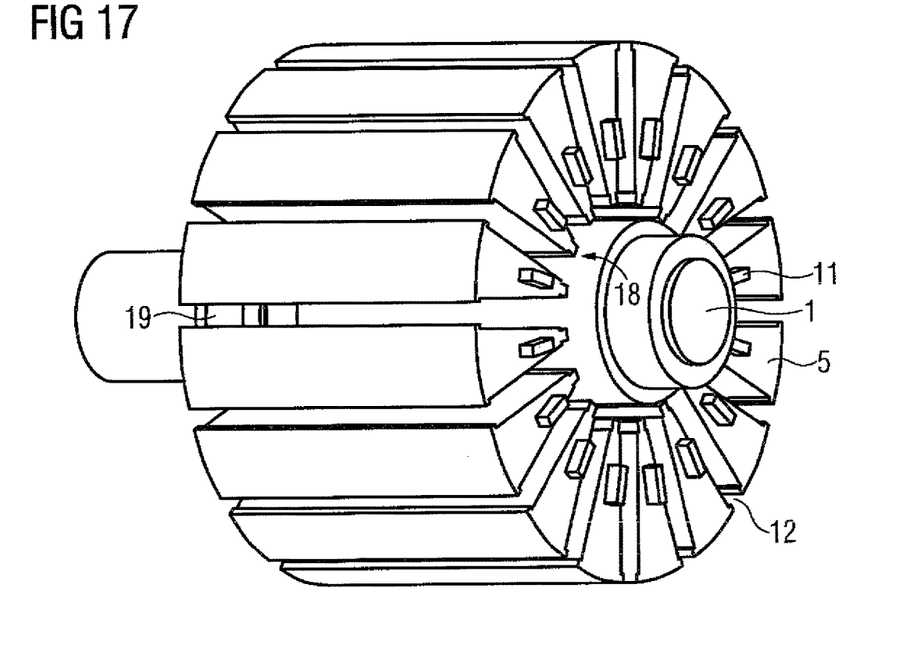
FIG. 17 shows the arrangement of FIG. 16 with the pre-mounted individual segments of the rotor according to FIG. 12.

These pre-mounted individual segments of the rotor (laminated core segment 5 with flexural support 11) are now arranged radially about the shaft 1 according to FIG. 17. In this case the protruding portions of the flexural supports 11 are inserted in the radially extending slots 16 of the end plate 15. The laminated core segments 5 in this case are spaced apart from the shaft 1 so that the laminated core segments 5 also do not indirectly come into contact via a sleeve. Thus, the laminated core segments are effectively magnetically isolated from one another.

The mechanical retention of the laminated core segments 5 takes place exclusively via the flexural supports 11 which are introduced by a non-positive, positive and/or material connection and which in turn are retained positively on the non-magnetic end plate 15. The positive connection between the end plate 15 and the flexural supports 11 acts in all directions perpendicular to the axis of rotation of the shaft 1. Therefore, the torque is transmitted from the laminated core segments 5 via the flexural supports 11 onto the end plate 15 and to the shaft 1.

Figure 18:
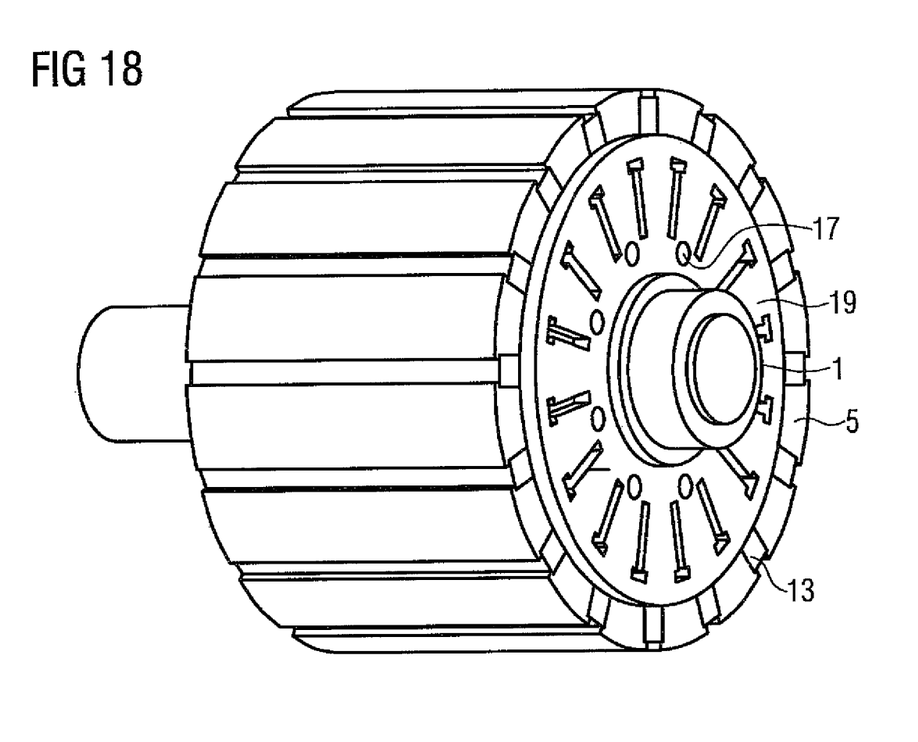
FIG. 18 shows the fully-mounted individual-segment rotor based on the arrangement of FIG. 17 with the mounted magnets and mounted second end plate.

FIG. 18 shows the individual-segment rotor of this embodiment in the fully-mounted state. Firstly, the permanent magnets 13 are inserted into the magnetic pockets 12. They have the same axial length as the laminated core segments 5. Secondly, a second end plate 15 is placed on the previously open front face of the laminated core segments and/or the entire laminated core. This second end plate is preferably of the same construction as the first end plate on the other side. As a result, it also has radially extending slots into which the portions of the flexural supports 11 protruding from the laminated core segments 5 are inserted. The positive connection of this connection in all directions perpendicular to the axis of rotation of the shaft 1 once again produces the desired strength on this side of the individual-segment rotor and ensures high torque transmission. The end plate 15 designed as a fastening ring is in turn non-magnetic in order to avoid magnetic scatter and also retains the laminated core segments 5 in the axial direction.

Alternatively, the second end plate 15 may be initially replaced by an intermediate plate, a further core then being adjoined thereto. This may be necessary with large overall lengths of the individual-segment rotor in order to reduce the deflection of the cores.

The advantages set forth in connection with the first exemplary embodiments according to FIGS. 1 to 10 substantially also apply to this exemplary embodiment according to FIGS. 11 to 18. An additional advantage when using end plates for torque transmission is that the end plates may be provided with holes 17 through which a cooling agent, in particular cooling air, may be supplied into the gap 18 between the shaft 1 and the laminated core. As a result, the cooling properties of the rotor may be improved. A further effect of the gap 18 is that the rotor weight and thus also the inertia of the rotor are reduced and also a scatter-resistant construction may be implemented.

The invention claimed is:

1. An individual-segment rotor, comprising:
   a plurality of laminated core segments arranged about an axis of rotoation;
   a plurality of separate flexural supports, each of the flexural supports configured for radially fastening the laminated core segments in one-to-one correspondence, said plurality of flexural supports being fastened in the laminated core segments by a material connection and adhesively bonded into the laminated core segments, said flexural supports having a length which in an axial direction is longer than a length of the laminated core segments so as to protrude from a front face of the laminated core segments with a protruding portion which defines an inner radial end;
   at least one fastening ring configured to radially retain the plurality of flexural supports and to press the flexural supports radially outwardly, said at least one fastening ring disposed against the front face of the laminated core segments and extending only circumferentially around the inner radial end of the protruding portion of the flexural supports; and
   a sleeve to positively retain the plurality of laminated core segments in a radial direction, said sleeve having a relative permeability which is below 5.

2. The individual-segment rotor of claim 1, wherein the plurality of flexural supports have a strip-shaped configuration, each flexural support configured to protrude from both front faces of a corresponding one of the laminated core segments.

3. The individual-segment rotor of claim 1, wherein the plurality of flexural supports are positively fastened in the laminated core segments.

4. The individual-segment rotor of claim 1, wherein the plurality of laminated core segments are positively retained in a circumferential direction on the sleeve.

5. A method for producing an individual-segment rotor, comprising:
   arranging a plurality of laminated core segments around an axis of rotation;
   radially fastening the laminated core segments to a plurality of separate flexural supports in one-to-one correspondence by a material connection involving adhesively bonding the flexural supports into the laminated core segments with the flexural supports having a length which in an axial direction is longer than a length of the laminated core segments so as to protrude from a front face of the laminated core segments with a protruding portion which defines an inner radial end;
   fixing the plurality of flexural supports by placing at least one fastening ring in a radial direction against the front face of the laminated core segments and only circumferentially around the inner radial end of the protruding portion of the flexural supports;
   pressing the plurality of flexural supports by the fastening ring radially outwardly; and
   positively retaining the plurality of laminated core segments in the radial direction on a sleeve having a relative permeability being below 5.

* * * * *